(12) United States Patent
Francis et al.

(10) Patent No.: US 7,836,395 B1
(45) Date of Patent: Nov. 16, 2010

(54) SYSTEM, APPARATUS AND METHOD FOR TRANSFORMATION OF JAVA SERVER PAGES INTO PVC FORMATS

(75) Inventors: Arthur R. Francis, Apex, NC (US); Brad B. Topol, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1142 days.

(21) Appl. No.: 09/543,952

(22) Filed: Apr. 6, 2000

(51) Int. Cl.
  *G06F 17/00* (2006.01)
(52) U.S. Cl. .................... 715/239; 715/234
(58) Field of Classification Search ........... 715/200, 715/201, 209, 210, 234, 239, 273, 500, 500.1, 715/513, 515, 516, 526
  See application file for complete search history.

(56) References Cited

U.S. PATENT DOCUMENTS

| | | | | |
|---|---|---|---|---|
| 5,892,900 | A * | 4/1999 | Ginter et al. | 713/200 |
| 5,940,844 | A * | 8/1999 | Cahill et al. | 715/526 |
| 6,072,598 | A * | 6/2000 | Tso | 358/442 |
| 6,185,586 | B1 * | 2/2001 | Judson | 715/513 |
| 6,253,326 | B1 | 6/2001 | Lincke et al. | |
| 6,334,126 | B1 * | 12/2001 | Nagatomo et al. | 707/4 |
| 6,336,124 | B1 * | 1/2002 | Alam et al. | 715/523 |
| 6,336,137 | B1 * | 1/2002 | Lee et al. | 709/219 |
| 6,339,786 | B1 * | 1/2002 | Ueda et al. | 709/217 |
| 6,343,318 | B1 * | 1/2002 | Hawkins et al. | 709/219 |
| 6,356,905 | B1 * | 3/2002 | Gershman et al. | 707/10 |
| 6,401,085 | B1 * | 6/2002 | Gershman et al. | 707/4 |
| 6,430,624 | B1 * | 8/2002 | Jamtgaard et al. | 709/246 |
| 6,507,857 | B1 * | 1/2003 | Yalcinalp | 715/513 |
| 6,535,896 | B2 * | 3/2003 | Britton et al. | 715/523 |
| 6,578,192 | B1 * | 6/2003 | Boehme et al. | 717/115 |
| 6,585,777 | B1 * | 7/2003 | Ramaley et al. | 715/513 |
| 6,590,588 | B2 * | 7/2003 | Lincke et al. | 345/744 |
| 6,671,757 | B1 * | 12/2003 | Multer et al. | 710/100 |
| 6,675,228 | B1 * | 1/2004 | Bahrs et al. | 719/318 |
| 6,694,336 | B1 * | 2/2004 | Multer et al. | 707/201 |
| 6,785,730 | B1 * | 8/2004 | Taylor | 709/230 |

(Continued)

FOREIGN PATENT DOCUMENTS

JP  09-222974  8/1997

(Continued)

OTHER PUBLICATIONS

Jason Hunter, Java Servlet Programming, Published Nov. 1, 1998 by O'Reilly, accessed from the Internet in 2 parts: Overview pp. 1-5 and 2.6 Java Server Pages pp. 1-15.*

(Continued)

*Primary Examiner*—Stephen S Hong
*Assistant Examiner*—Gregory J Vaughn

(57) ABSTRACT

A system, apparatus and method for transforming Java Server Pages (JSPs) into pervasive computing (PvC) device specific JSPs. An original JSP is parsed for JSP tags. The JSP tags are converted to HyperText Mark-up Language (HTML) comment tags. The JSP is then transformed into a PvC device specific JSP by converting the HTML tags in the JSP to HTML tags for a specific PvC device. The HTML comment tags are then parsed for the comment tags having embedded JSP tags. The JSP tags are then restored by removing the HTML comment tag identifiers. A PvC device specific JSP is thus created.

31 Claims, 7 Drawing Sheets

U.S. PATENT DOCUMENTS 6,826,693 B1 * 11/2004 Yoshida et al. .............. 713/201
6,847,988 B2 * 1/2005 Toyouchi et al. ............ 709/203

FOREIGN PATENT DOCUMENTS

| WO | WO9961983 | 12/1999 |
|---|---|---|
| WO | WO0111905 | 2/2001 |
| WO | WO0116700 | 3/2001 |

OTHER PUBLICATIONS

Arata Kurihara, "Web Contents Convert Server-Spyglass Prism 2.0" debut, mobile media magazine, Japan, C-Media Co. 1998, Sep. 13, vol. 6, No. 10, p. 66-67.

Kunihiro, Saitoh, "Light-up Tag Conversion Server by Increasing Web Access from Cellular Phones," Nikkei Internet Technology, Japan, Nikkei BP Co., Mar. 22, 2000, No. 33, p. 23.

A. Dr. Akon, "Application Server Development by Development Tool-Visual Café 3" E.S. Enterprise Suite for Distributed Objects, Software Design, Japan Gijutuhyourou-sya, Co. 1999, Jun. 18, No. 104, p. 196-201.

Tatuya, Aoyagi, Java API Tsurezuregusa 13-Paragraph, Java World, Japan, Oct. 29, 1999, vol. 3, No. 12, p. 98-106.

Rockford Lhotka, "Programmer's Selection", Development for Business Application by Visual Basic 5.0 Business Objects, December 5, 1998, Shoeisha Co., Ltd., p. 160, 214.

Sanjaya Hettihewa, "Create Active Pages with VBScript", Visual basic Magazine, Japan, Jul. 1, 1997, vol. 3, No. 4, p. 159-166.

* cited by examiner

```
<HTML>
<HEAD>
<TITLE>Welcome to the Halloween House of Terror</TITLE>
<BODY>
<H1>Welcome to the Halloween House of Terror!!</H1>
<HR>
<P>Voted the most frightening haunted house three years in a row, the <STRONG>Halloween
House of Terror</STRONG> provides the ultimate in Halloween thrills. Over <STRONG>20 rooms
of thrills and Excitement</STRONG> to make your blood run cold and your hair stand on end!</P>
<P>The Halloween House of Terror is open from <EM>October 20 to November 1st</EM>, with a
gala celebration on Halloween night. Our hours are:</P>
<UL>
<LI>Mon-Fri 5pm-midnight
<LI>Sat & Sun 5pm-3AM
<LI><STRONG>Halloween Night (10/31)</STRONG>: 3pm-???
</UL>
<P>The Halloween House of Terror is located at:<BR>
The Old Waterfall Shopping Center<BR>
1020 Mirabella Ave<BR>
Springfield, CA 94532<BR>
</P>
</BODY>
</HTML>
```

Figure 3

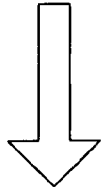

Welcome to the Halloween House of Terror

Welcome to the Halloween House of Terror !!

Voted the most frightening haunted house three years in a row, the Halloween House of Terror provides the ultimate in Halloween thrills. Over 20 rooms of thrills and Excitement to make your blood run cold and your hair stand on end!

The Halloween House of Terror is open from <u>October 20 to November 1st</u>, with a gala celebration on Halloween night. Our hours are:

Mon-Fri 5pm-midnight
    Sat & Sun 5pm-3AM
    Halloween Night (10/31): 3pm-???

The Halloween House of Terror is located at:
The Old Waterfall Shopping Center
1020 Mirabella Ave
Springfield, CA 94532

SYSTEM, APPARATUS AND METHOD FOR TRANSFORMATION OF JAVA SERVER PAGES INTO PVC FORMATS

BACKGROUND OF THE INVENTION

1. Technical Field

The present invention is directed to a system, apparatus and method for the transformation of Java server pages into formats for various pervasive computing (PvC) devices.

2. Description of Related Art

The use of Java Server Pages (JSPs) for the generation of dynamic HyperText Mark-up Language (HTML) content is becoming more popular. JSP provides a methodology by which information related to the content and information related to the presentation of the content may be separated. For example, JSP provides a <bean> tag which is utilized to obtain content, such as Java applets, while HTML tags are used to specify presentation of the content.

A problem arises in these prior JSPs in that they are designed with the assumption that the presentation of the content will be rendered in a browser that executes on a desktop workstation with a full-sized, high resolution, full-color monitor. As the use of mobile handheld pervasive computing (PvC) devices becomes more prevalent, the assumption used in the design of JSPs becomes a stumbling block since there is a need to deliver the JSP to a variety of PvC devices whose browsing screen size capabilities are drastically different from that of a desktop workstation.

One way to address this problem is to have a transcoding proxy server, or servlet, intercept the JSP and transcode it dynamically, i.e., on the fly, as the JSP is being sent to the PvC device. This option results in extra overhead costs incurred each and every time the JSP is invoked.

A second approach to solving this problem is to have a human JSP developer design and create separate JSPs for each and every PvC device one might want to support. This approach has the disadvantage of extra cost required to have the additional JSPs authored by a human developer who needs to be cognizant of the capabilities of the PvC devices he or she intends to support.

Thus, it would be advantageous to have a system, apparatus and method that provides a mechanism by which JSPs may be automatically converted to formats useable by a plurality of PvC devices.

SUMMARY OF THE INVENTION

A system, apparatus and method for transforming Java Server Pages (JSPs) into pervasive computing (PvC) device specific JSPs. An original JSP is parsed for JSP tags. The JSP tags are converted to HyperText Mark-up Language (HTML) comment tags. The JSP is then transformed into a PvC device specific JSP by converting the HTML tags in the JSP to HTML tags for a specific PvC device. The HTML comment tags are then parsed for the comment tags having embedded JSP tags. The JSP tags are then restored by removing the HTML comment tag identifiers. A PvC device specific JSP is thus created.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary diagram illustrating the use of HTML tags to create an HTML document;

DETAILED DESCRIPTION OF THE PREFERRED EMBODIMENT

Figure 1:
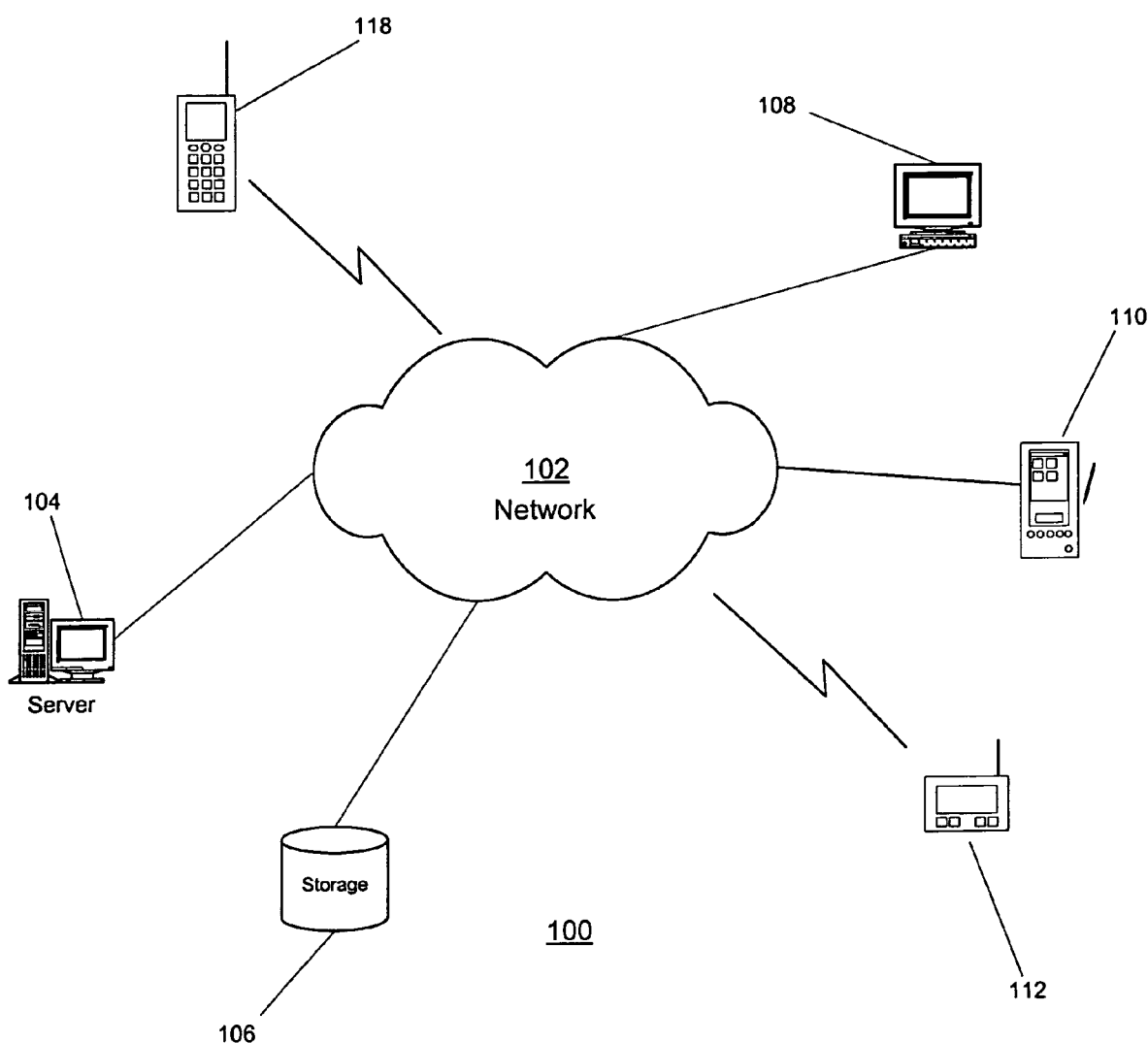
FIG. 1 is an exemplary block diagram of a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections. Network 102 may further include wireless communication connections through, for example, base stations, satellites, and the like, for communicating with wireless communication devices.

In the depicted example, server 104 is connected to network 102, along with storage unit 106. In addition, clients 108, 110, 112 and 118 are also connected to network 102. These clients, 108, 110, 112 and 118, may be, for example, personal computers, network computers, personal digital assistants (PDAs), alphanumeric pagers, cellular telephones, and the like. Any communication device, either wired or wireless, that is capable of receiving and displaying a Java Server Page (JSP) is intended to be within the scope of the term "client" as used in this disclosure.

In the depicted example, server 104 provides data, such as boot files, operating system images and applications, and in particular JSPs, to clients 108-118. Clients 108-118 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
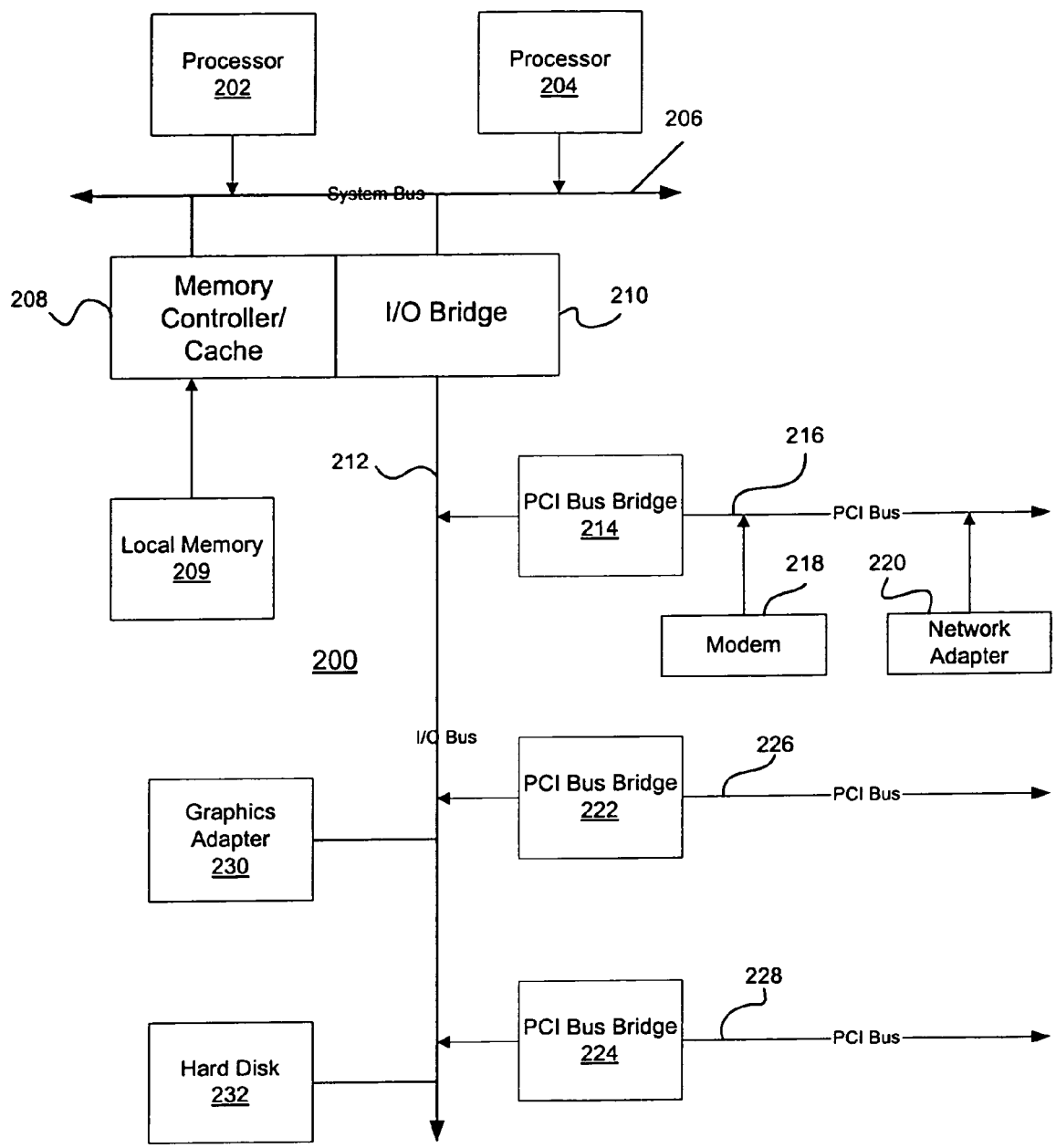
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors.

Communications links to network computers 108-112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

The server 200 stores a Java Server Page (JSP) that is designed for presentation on a typical desktop workstation, such as client device 108. The JSP is comprised of, for example, text, images and tags that are used to generate a JSP presentation on a client device when the JSP is downloaded to the client device. For example, the JSP may comprise text, HyperText Mark-up Language (HTML) tags identifying presentation formats of the text, HTML tags identifying in-line image files to be displayed, and JSP tags. JSP tags are used to encapsulate scripting language fragments into an HTML page. JSP pages use JSP tags or scriptlets to generate the dynamic content on the page (the content that changes according to the request, such as requested account information or the price of a specific bottle of wine). The logic that generates the content is encapsulated in tags and JavaBean components, and tied together in scriptlets, all of which are executed on the server side. More information regarding JSP technology and JSP tags may be obtained from the JSP section of the Sun Corporation Web site, which is hereby incorporated by reference.

While the present invention will be described with reference to HTML tags, one of ordinary skill in the art should appreciate that any mark-up language, such as XML, may be utilized without departing from the spirit and scope of the present invention.

FIG. 3 illustrates an example of the use of HTML tags to dictate the manner in which text information is displayed by a browser on a client device. As shown in FIG. 3, the HTML tags may include tags identifying headers, titles, text bodies, paragraphs, underlining, bold text, and the like. The bottom portion of FIG. 3 shows how these tags are processed by the browser application to generate a formatted Web page for display to a user.

Figure 4:
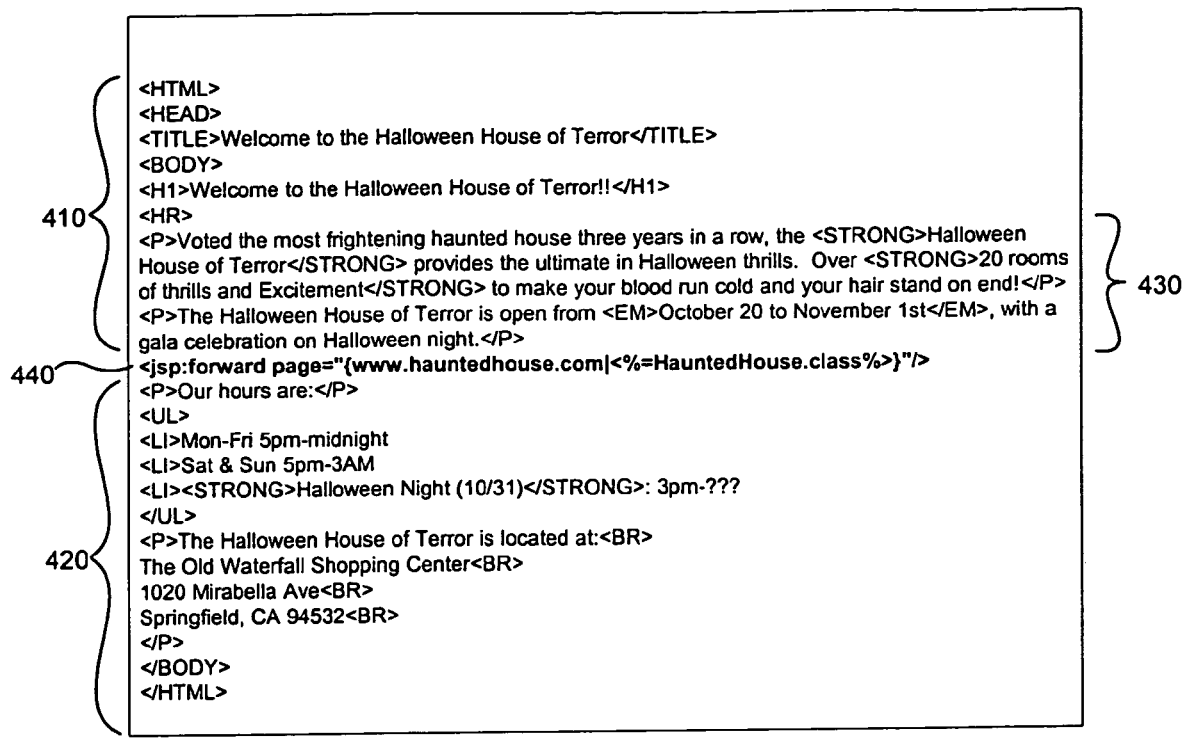
FIG. 4 is an exemplary diagram of the use of JSP tags along with HTML tags in a JSP.

JSPs use tags in a similar manner as the HTML tags shown in FIG. 3 to designate the format of the JSP page as it will be displayed. The JSPs further include JSP tags designating JSP components, such as Java beans or applets, that are to be executed when accessing the JSP. FIG. 4 provides an example of the use of HTML tags and JSP tags for a simplified JSP. As shown in FIG. 4, the JSP includes HTML tags 410 and 420 that designate formatting of text information 430. The JSP further includes JSP tag 440 that forwards a client request to a JSP file "HauntedHouse.class" for processing.

The JSP tags are applicable to any client device. Thus, the JSP tags need not be modified when converting a general JSP to a PvC device specific JSP for a PvC device having different capabilities than a desktop workstation. The HTML tags, however, do require modification so that they are consistent with the capabilities of the PvC device to which the JSP is transmitted.

The present invention provides a system, apparatus and method for converting JSPs designed for desktop workstations, into JSPs that are useable by a plurality of PvC devices. The present invention parses a JSP to locate and mask the JSP tags and convert the HTML tags to PvC device specific HTML tags. The method according to the present invention may be implemented, for example, as one or more Java applications, applets, or Java beans resident on a server of a distributed data processing system, such as server 140 or server 200.

The Java beans may be executed when, for example, a system operator designates, via an input device (not shown), that a JSP is to be converted for use by PvC devices. Alternatively, the Java beans may be executed when a request is first received from a PvC device.

For example, with reference to FIGS. 1 and 2, when a request for a JSP is received by a server 200 from a PvC device, such as PvC device 110, the server 200 receives the request via the network adapter 220. The server 200 then processes request by parsing header information of the request to determine the type of PvC device from which the request was received. For example, the header of the request may include a device type identifier indicating the type of device that sent the request.

The server 200 may then search for a stored version of the requested JSP on hard disk 232 corresponding to the PvC device from which the request was received. This search may be based on, for example, filename and filename extension. The various PvC device specific JSPs may be stored under the same filename with different extensions designating the PvC for which the JSP is formatted. Alternatively, the filenames may be different based on the PvC for which they are formatted.

If an appropriate version is available, the JSP is sent to the PvC device. However, if an appropriate version is not available, the server 200 may invoke the Java beans to convert the JSP into a PvC specific JSP for the particular PvC device sending the request. This PvC specific JSP will then be stored on the server and utilized when later requests from similar PvC devices are received.

Figure 5:
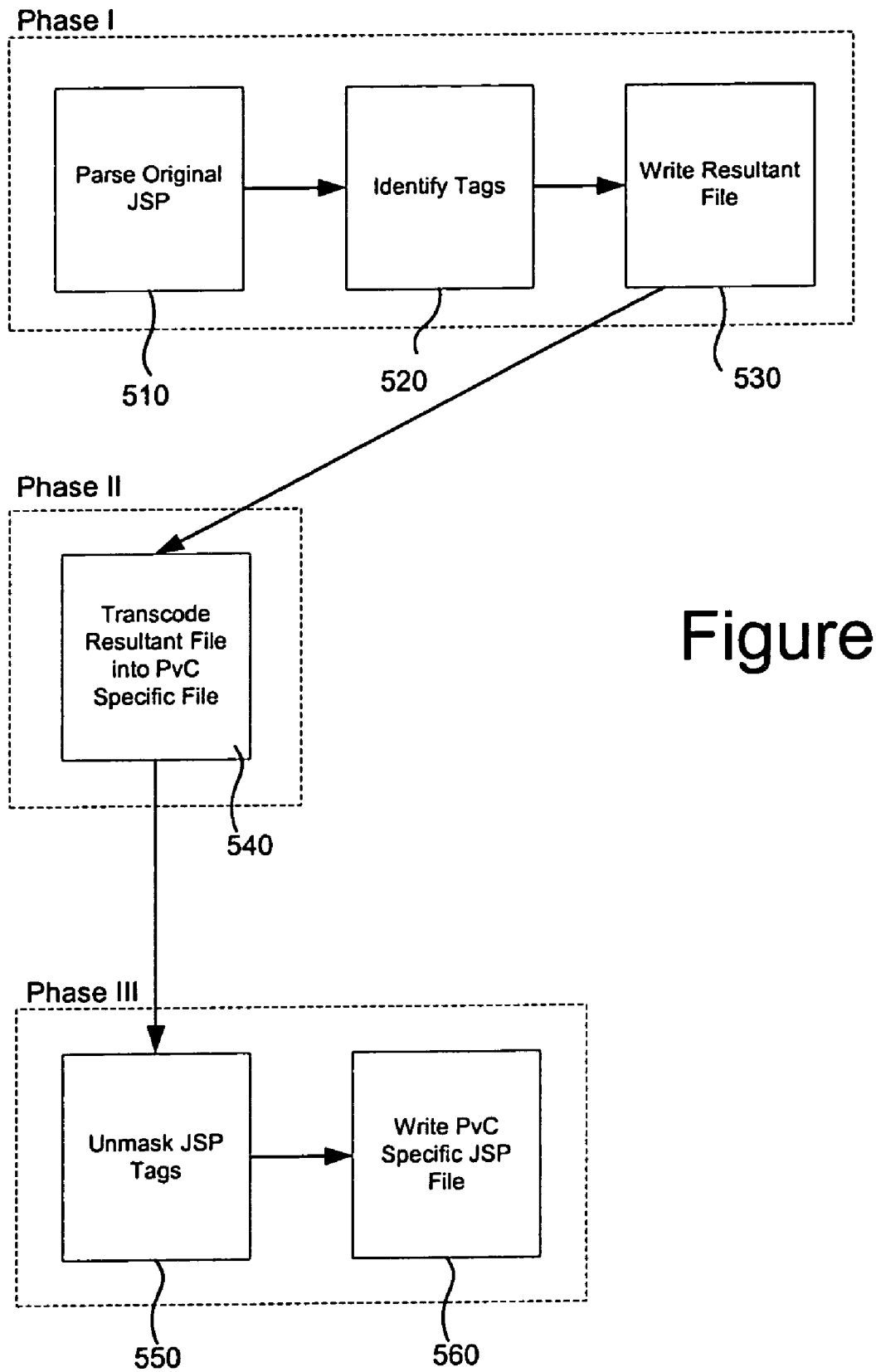
FIG. 5 is an exemplary diagram illustrating the phases of operation of the present invention.

FIG. 5 is an illustration of the various phases implemented by the present invention. As shown in FIG. 5, phase I of operating involves parsing the original JSP file 510 to produce a resultant file 530. Through parsing of the original JSP file 510, the HTML tags and JSP tags in the JSP are identified 520. The HTML tags and JSP tags are identified by looking for the occurrence of symbols designating the various tags. As the JSP file 510 is parsed, HTML constructs and HTML tags are written to a resultant file 530. JSP tags are masked by writing them to the resultant file 530 as HTML comment tags. Thus, the resultant file 530 contains only valid HTML constructs, i.e., HTML tags and textual information. HTML tags are indicators in HTML documents that identify document elements, structure, formatting, and hypertext links to other documents or to included media. Enclosed within these tags is textual information that is presented to the display device.

Next, in phase II of the operation, the resultant file 530 is transcoded into one or more PvC device specific files 540. The JSP tags that are embedded as HTML comment tags remain in the transcoded files 540 as HTML comment tags. The transcoding of the resultant file 530 into PvC specific files 540 involves placing the identified HTML tags into a document object model and performing a transcoding node by node. As is know to those of ordinary skill in the art, a document object model provides a representation of the hierarchical arrangement of document tags in a tree-like structure. Each node of the document object model represents a document tag.

The transcoding of the present invention proceeds through the document object model node by node and converts the HTML tag associated with the node to a corresponding tag in a mark-up language useable by the particular PvC device. For example, the HTML tag may be converted to an equivalent Wireless Mark-up Language (WML) tag or a Handheld Device Markup Language (HDML) tag. Any tags that aren't supported by the mark-up language for the PvC device are removed and replaced with a closest equivalent.

As a part of this processing phase, the occurrence of in-line images will also be transcoded to the resolution of the target device. As a result of the image transcoding process, static representation of the original image will be saved with a new file extension that indicates the image conversion format. In conjunction with the image transcoding process, the links to the images in each of the generated files will be updated to reflect the transcoded file that contains the resolution requirements of the target PvC device.

In the third phase of the operation, the JSP tags are unmasked 550. This phase involves parsing the transcoded files, locating the hidden JSP tags and converting the file back to a valid JSP file. This may be done by parsing the transcoded files, identifying HTML comment tags, determining if the content of the HTML comment tags fit the format of a JSP tag, and removing the HTML comment tag identifiers when saving the transcoded file to thereby restore the JSP tags. In this way, a JSP file is generated that is transcoded for a specific PvC device 560.

Figure 6:
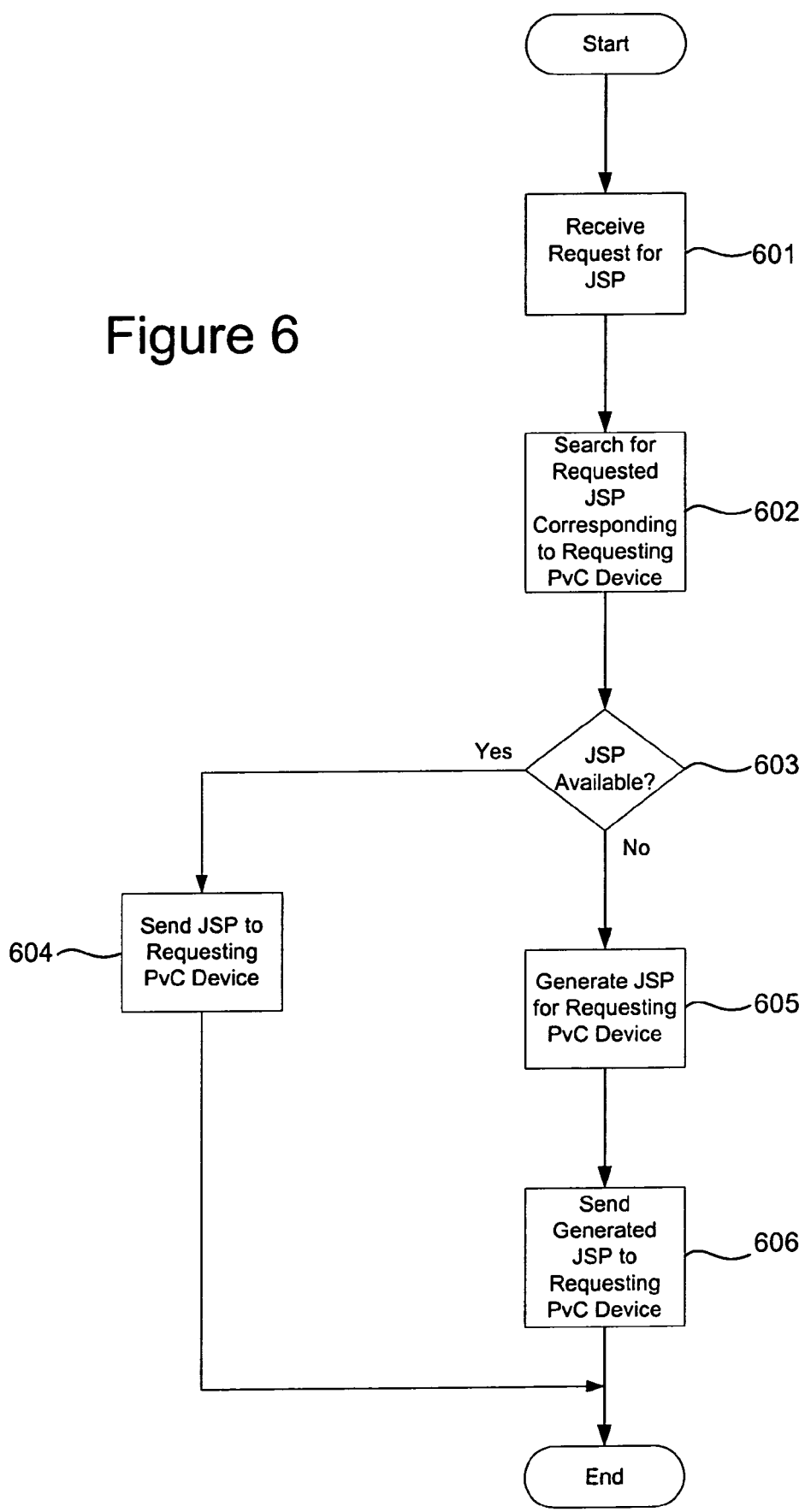
FIG. 6 is a flowchart outlining an exemplary operation of the present invention.

FIG. 6 is a flowchart outlining an exemplary operation of the present invention. As shown in FIG. 6, the operation starts with receiving a request for a JSP from a PvC device (step 601). A search is then conducted for a version of the JSP that is useable by the requesting PvC device (step 602). A determination is made as to whether or not a JSP for the requesting PvC device is found (step 603). If so, the JSP is sent to the PvC device (step 604). If not, a JSP for the requesting PvC device is generated and stored (step 605). The generated JSP is then sent to the requesting PvC device (step 606). The operation then ends.

While step 605 above is described as generating only the PvC specific JSP for the requesting PvC device, the operation is not limited to such. Rather, the PvC specific JSPs for all supported PvC devices may be generated. Additionally, the PvC specific JSPs may be generated in response to a command received from a user, such as a system operator.

Figure 7:
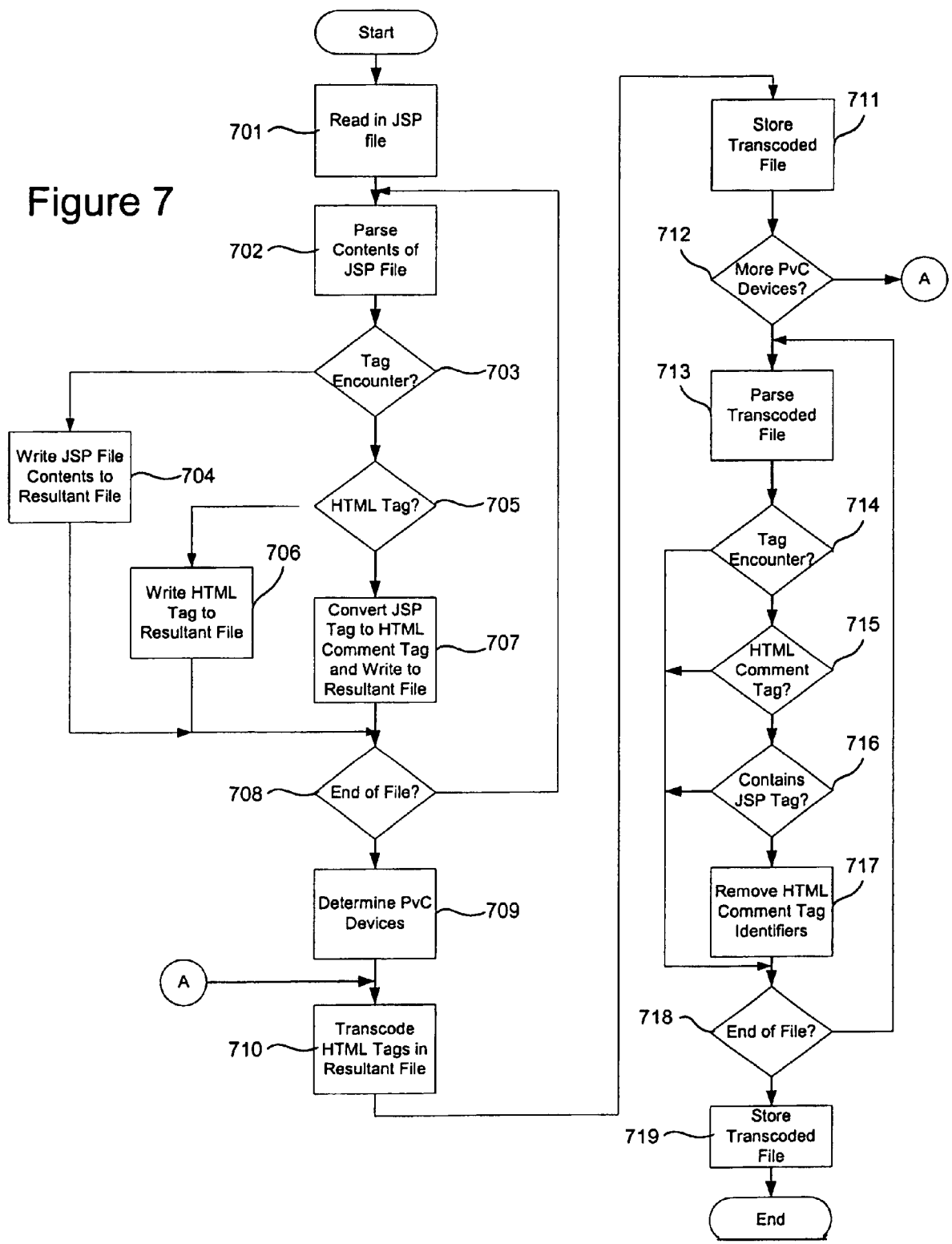
FIG. 7 is a flowchart outlining an exemplary operation of the present invention for converting a JSP file to a PvC specific JSP file.

FIG. 7 is a flowchart outlining an exemplary operation of the present invention when generating a PvC specific JSP from an original JSP. This operation may be implemented as step 605 in FIG. 6, described above.

As shown in FIG. 7, the operation starts with reading a JSP file and storing the contents of the JSP file in a buffer memory (step 701). The contents of the JSP file are then parsed (step 702). A determination is made as to whether or not a tag is encountered (step 703). If not, the contents are written to a resultant file (step 704). If so, a determination is made as to whether the tag is an HTML tag (step 705). If so, the HTML tag is written to the resultant file (step 706).

If not, the tag must be a JSP tag. The JSP tag is then converted to an HTML comment tag and written to the resultant file (step 707). The process is then repeated until an end of file is encountered (step 708).

Thereafter, it is determined for which PvC devices the JSP will be converted (step 709). Then, for each PvC device, the following steps are performed. The HTML tags in the resultant file are transcoded to PvC device specific tags (step 710). A transcoded file is then stored for the PvC device containing the transcoded HTML tags and resultant file content (step 711). A determination is then made as to whether there are more PvC devices for which the JSP should be transcoded (step 712). If so, the operation returns to step 710. If not, the operation proceeds to phase III.

In phase III, the operation performs the following steps for each of the PvC specific transcoded files that were created. The transcoded file is parsed for HTML comments tags (step 713). A determination is made as to whether a tag is encountered (step 714). If not, the operation continues to parse the transcoded file until an end of file is encountered (step 718) at which time the operation ends.

If a tag is encountered, it is determined whether or not the tag is an HTML comment tag (step 715). If not, the operation continues to parse the transcoded file until an end of file is encountered (step 718) at which time the operation ends. If so, a determination is made as to whether the HTML comment tag contains a JSP tag (step 716). If not, the operation goes to step 718. If so, the operation removes the HTML comment tag identifiers (step 717) and continues to parse the transcoded file until an end of file is encountered (step 718). The transcoded file with the restored JSP tags is then stored (step 719). After all of the transcoded files are processed, the operation ends.

Thus, the present invention provides a system, apparatus and method for automatically generating PvC specific JSP files from a general JSP file. In this way, the expense of providing JSP files for a variety of PvC devices is greatly reduced.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of transforming an original Java Server Page (JSP) file into a pervasive computing (PvC) device specific JSP file, comprising:
   receiving a request for the original JSP file at a server, wherein the request is sent from the PvC device, and wherein the original JSP file is stored on the server;
   parsing the original JSP file for JSP tags;
   masking the JSP tags;
   converting non-masked tags in the original JSP file into PvC device specific format tags;
   unmasking the JSP tags; and
   storing a transformed JSP file containing the PvC device specific format tags and the JSP tags, wherein the parsing, masking, converting, unmasking and storing steps are performed by the server.

2. The method of claim 1, wherein masking the JSP tags includes embedding the JSP tags into HyperText Mark-up Language (HTML) comment tags, wherein the embedding step is performed at the server.

3. The method of claim 2, wherein unmasking the JSP tags includes removing HTML comment tag identifiers from the HTML comment tags in which the JSP tags are embedded.

4. The method of claim 1, wherein storing the transformed JSP file includes storing the transformed JSP file with a filename that is unique to the particular PvC device for which the transformed JSP file is formatted.

5. The method of claim 4, wherein the filename has a unique extension for the PvC device for which the transformed JSP file is formatted.

6. The method of claim 1, wherein parsing the original JSP file comprises:
   determining if a tag is encountered;
   if a tag is encountered, determining if the tag is an HTML tag; and
   if the tag is not an HTML tag, identifying the tag as a JSP tag.

7. The method of claim 6, wherein parsing the original JSP file further comprises:
   if a tag is not encountered, writing the JSP file content to a resultant file;
   if the tag is a HTML tag, writing the HTML tag to the resultant file; and
   if the tag is a JSP tag, writing the JSP tag to the resultant file embedded in an HTML comment tag.

8. The method of claim 1, further comprising:
   in response to receiving the request, determining a type of the PvC device based on a header of the request; and
   locating the original JSP file in the server based on a filename of the original JSP file corresponding to the type of PvC device.

9. A server for transforming an original Java Server Page (JSP) file into a pervasive computing (PvC) device specific JSP file, the server comprising:
   a processor; and
   a storage device, connected to the processor, said storage device containing the original JSP file;
   wherein the processor receives a request from a PvC device for the original JSP file, parses the original JSP file stored on the storage device for JSP tags, masks the JSP tags, converts non-masked tags in the original JSP file into PvC device specific format tags, unmasks the JSP tags, and stores a transformed JSP file containing the PvC device specific format tags and the JSP tags on the storage device.

10. The server of claim 9, wherein the processor masks the JSP tags by embedding the JSP tags into HyperText Mark-up Language (HTML) comment tags.

11. The server of claim 10, wherein the processor unmasks the JSP tags by removing HTML comment tag identifiers from the HTML comment tags in which the JSP tags are embedded.

12. The server of claim 9, wherein the processor stores the transformed JSP file with a filename that is unique to the particular PvC device for which the transformed JSP file is formatted.

13. The server of claim 12, wherein the filename has a unique extension for the PvC device for which the transformed JSP file is formatted.

14. The server of claim 9, wherein while the processor parses the JSP file the processor:
   determines if a tag is encountered;
   if a tag is encountered, determines if the tag is an HTML tag; and
   if the tag is not an HTML tag, identifies the tag as a JSP tag.

15. The server of claim 9, wherein while the processor parses the JSP file, the processor further:
   writes the JSP file content to a resultant file, if a tag is not encountered;
   writes the HTML tag to the resultant file, if the tag is a HTML tag; and
   writes the JSP tag to the resultant file embedded in an HTML comment tag, if the tag is a JSP tag.

16. A computer program product in a computer readable medium for transforming an original Java Server Page (JSP) file into a pervasive computing (PvC) device specific JSP file, comprising:
   first instructions for receiving a request for the original JSP file at a server, wherein the request is sent from the PvC device, and wherein the original JSP file is stored on the server;
   second instructions for parsing the original JSP file for JSP tags;
   third instructions for masking the JSP tags;
   fourth instructions for converting non-masked tags in the original JSP file into PvC device specific format tags;
   fifth instructions for unmasking the JSP tags; and
   sixth instructions for storing a transformed JSP file containing the PvC device specific format tags and the JSP tags, wherein the second, third, fourth, fifth, and sixth instructions are performed by the server.

17. The computer program product of claim 16, wherein the second instructions include instructions for embedding the JSP tags into HyperText Mark-up Language (HTML) comment tags, wherein embedding of JSP tags is performed at the server.

18. The computer program product of claim 17, wherein the fourth instructions include instructions for removing HTML comment tag identifiers from the HTML comment tags in which the JSP tags are embedded.

19. The computer program product of claim 16, wherein the fifth instructions include instructions for storing the transformed JSP file with a filename that is unique to the particular PvC device for which the transformed JSP file is formatted.

20. The computer program product of claim 19, wherein the filename has a unique extension for the PvC device for which the transformed JSP file is formatted.

21. The computer program product of claim 16, wherein the second instructions include instructions for:

determining if a tag is encountered;
if a tag is encountered, determining if the tag is an HTML tag; and
if the tag is not an HTML tag, identifying the tag as a JSP tag.

22. The computer program product of claim 21, wherein the second instructions further include instructions for:
writing the JSP file content to a resultant file, if a tag is not encountered;
writing the HTML tag to the resultant file, if the tag is an HTML tag; and
writing the JSP tag to the resultant file embedded in an HTML comment tag, if the tag is a JSP tag.

23. The computer program product of claim 16, further comprising:
in response to receiving the request, seventh instructions for determining a type of the PvC device based on a header of the request; and
eighth instructions for locating the original JSP file in the server based on a filename of the original JSP file corresponding to the type of PvC device.

24. A system for transforming an original Java Server Page (JSP) file into a pervasive computing (PvC) device specific JSP file, comprising:
means for receiving a request for the original JSP file at a server, wherein the request is sent from the PvC device, and wherein the original JSP file is stored on the server;
means for parsing the original JSP file for JSP tags;
means for masking the JSP tags;
means for converting non-masked tags in the original JSP file into PvC device specific format tags;
means for unmasking the JSP tags; and
means for storing a transformed JSP file containing the PvC device specific format tags and the JSP tags, wherein the means for parsing, masking, converting, unmasking and storing are performed by the server.

25. The system of claim 24, wherein the means for masking embeds the JSP tags into HyperText Mark-up Language (HTML) comment tags, wherein embedding of JSP tags is performed at the server.

26. The system of claim 25, wherein the means for unmasking removes HTML comment tag identifiers from the HTML comment tags in which the JSP tags are embedded.

27. The system of claim 24, wherein the means for storing stores the transformed JSP file with a filename that is unique to the particular PvC device for which the transformed JSP file is formatted.

28. The system of claim 27, wherein the filename has a unique extension for the PvC device for which the transformed JSP file is formatted.

29. The system of claim 24, wherein the means for parsing determines if a tag is encountered, determines if the tag is an HTML tag, if a tag is encountered, and if the tag is not an HTML tag, identifies the tag as a JSP tag.

30. The system of claim 29, wherein the means for parsing further writes the JSP file content to a resultant file, if a tag is not encountered, writes the HTML tag to the resultant file, if the tag is an HTML tag, and writes the JSP tag to the resultant file embedded in an HTML comment tag, if the tag is a JSP tag.

31. The system of claim 24, further comprising:
in response to receiving the request, means for determining a type of the PvC device based on a header of the request; and
means for locating the original JSP file in the server based on a filename of the original JSP file corresponding to the type of PvC device.

* * * * *